US012615524B2

(12) United States Patent
Yang et al.

(10) Patent No.: US 12,615,524 B2
(45) Date of Patent: Apr. 28, 2026

(54) TRANSMISSION METHOD, TERMINAL, AND NETWORK DEVICE

(71) Applicant: VIVO MOBILE COMMUNICATION CO., LTD., Guangdong (CN)

(72) Inventors: Yu Yang, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 483 days.

(21) Appl. No.: 17/570,521

(22) Filed: Jan. 7, 2022

(65) Prior Publication Data

US 2022/0132338 A1 Apr. 28, 2022

Related U.S. Application Data

(63) Continuation of application No. PCT/CN2020/101294, filed on Jul. 10, 2020.

(30) Foreign Application Priority Data

Jul. 11, 2019 (CN) .......................... 201910626772.9

(51) Int. Cl.
*H04W 24/04* (2009.01)
*H04B 7/06* (2006.01)

(52) U.S. Cl.
CPC ........ *H04W 24/04* (2013.01); *H04B 7/06964* (2023.05)

(58) Field of Classification Search
CPC ..... H04B 7/088; H04B 7/0695; H04W 24/10; H04W 24/04
See application file for complete search history.

(56) References Cited

U.S. PATENT DOCUMENTS

| | | | | |
|---|---|---|---|---|
| 2019/0166539 A1* | 5/2019 | Chen | ................. | H04W 36/0088 |
| 2020/0170027 A1 | 5/2020 | Yang et al. | | |
| 2020/0351827 A1* | 11/2020 | Chae | ................. | H04W 72/0453 |
| 2021/0058130 A1* | 2/2021 | Zhu | .................... | H04B 7/06964 |
| 2021/0067231 A1* | 3/2021 | Yang | ................... | H04B 7/0695 |
| 2021/0135713 A1* | 5/2021 | Kang | .................. | H04W 72/046 |
| 2021/0167839 A1* | 6/2021 | Zhang | .................. | H04L 5/0051 |

(Continued)

FOREIGN PATENT DOCUMENTS

| | | |
|---|---|---|
| CN | 108702763 A | 10/2018 |
| CN | 109391344 A | 2/2019 |

(Continued)

OTHER PUBLICATIONS

LG Electronics, "Discussion on beam failure recovery," 3GPP TSG RAN WG1 Meeting #91, R1-1719908, reno, USA Nov. 27-Dec. 1, 2017 (5 pages).

Vivo, "Remaining issues on mechanism to recover from beam failure," 3GPP TSG RAN WG1 Meeting #92, R1-1801521, Athens, Greece, Feb. 26-Mar. 2, 2018 (6 pages).

Vivo, "Interaction between MAC and PHY for intra-UE prioritization," 3GPP TSG-RAN WG2 Meeting #104, R2-1816942, Spokane, USA Nov. 12-16, 2018 (6 pages).

(Continued)

*Primary Examiner* — Syed Ali

(74) *Attorney, Agent, or Firm* — Price Heneveld LLP

(57) ABSTRACT

Embodiments of this disclosure provide a transmission method, a terminal, and a network device. The method includes: determining, based on a first priority relationship, third uplink information from first uplink information and second uplink information, where the first uplink information is first beam failure recovery request BFRQ information; and transmitting the third uplink information by using a first uplink resource.

16 Claims, 4 Drawing Sheets

12

Network device

11

Terminal

(56) References Cited

U.S. PATENT DOCUMENTS

| | | | |
|---|---|---|---|
| 2021/0176773 A1 | 6/2021 | Jiang | |
| 2021/0211181 A1* | 7/2021 | Yang | H04W 76/19 |
| 2021/0219366 A1* | 7/2021 | Matsumura | H04B 7/0695 |
| 2021/0234601 A1* | 7/2021 | Awadin | H04W 74/0808 |
| 2021/0320710 A1* | 10/2021 | Koskela | H04B 7/088 |
| 2021/0351834 A1* | 11/2021 | Yang | H04W 72/046 |
| 2022/0038165 A1* | 2/2022 | Li | H04B 7/0639 |
| 2022/0322325 A1* | 10/2022 | Svedman | H04W 36/00 |

FOREIGN PATENT DOCUMENTS

| | | | |
|---|---|---|---|
| CN | 109391405 A | 2/2019 | |
| WO | 2019024693 A1 | 2/2019 | |

OTHER PUBLICATIONS

Vivo, "Further discussion on Multi-Beam Operation", 3GPP TSG RAN WG1 #96bis, R1-1904097, Apr. 8-12, 2019, Xi'an, China.
Lenovo, Motorola Mobility, "Prioritized random access for beam failure recovery", 3GPP TSG-RAN WG2 Meeting NR AH 1801, R2-1800780, Jan. 22-26, 2018, Vancouver, Canada.
Sharp, "Identification of Contention based random access for beam failure recovery", 3GPP TSG-RAN WG2 #101, R2-1803045, Feb. 26-Mar. 2, 2018, Athens, Greece.
Apple, "BFR over CBRA", 3GPP TSG-RAN WG2 Meeting #103, R2-1812794, Aug. 20-24, 2018, Gothenburg, Sweden.

* cited by examiner

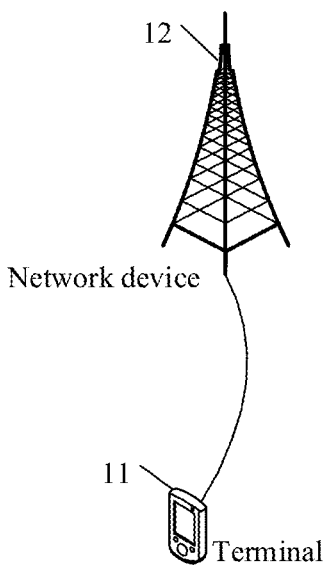

Network device

11 ⟍

Terminal

FIG. 1

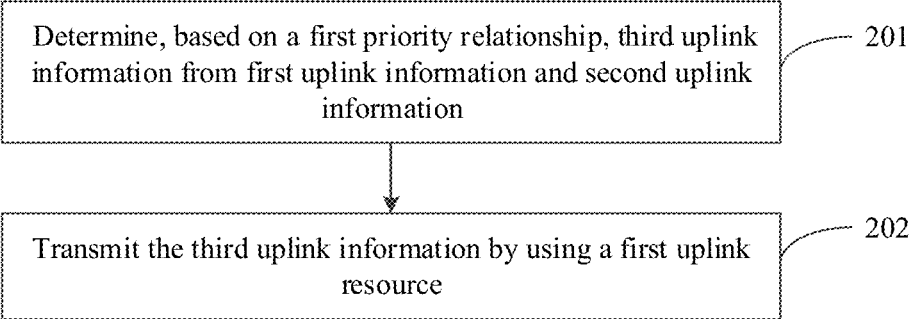

Determine, based on a first priority relationship, third uplink information from first uplink information and second uplink information — 201

Transmit the third uplink information by using a first uplink resource — 202

FIG. 2

Receive third uplink information transmitted by a terminal using a first uplink resource, where the third uplink information is uplink information determined based on a first priority relationship from first uplink information and second uplink information — 301

FIG. 3

TRANSMISSION METHOD, TERMINAL, AND NETWORK DEVICE

CROSS-REFERENCE TO RELATED APPLICATIONS

The present application is a continuation application of International Application No. PCT/CN2020/101294 filed on Jul. 10, 2020, which claims priority to Chinese Patent Application No. 201910626772.9 filed with China on Jul. 11, 2019, which are incorporated herein by reference in their entireties.

TECHNICAL FIELD

This disclosure relates to the field of communications technologies, and in particular, to a transmission method, a terminal, and a network device.

BACKGROUND

In a high-frequency band communications system, because a wavelength of a wireless signal is short, signal propagation is apt to be blocked, resulting in interruption of signal propagation. If radio link reestablishment in the related art is employed, it will take a long time. Therefore, a beam failure recovery mechanism is introduced. The beam failure recovery (BFR) mechanism in the related art includes the following four steps.

1. Beam failure detection. A terminal performs measurement on a beam failure detection reference signal at a physical layer, and determines, based on a measurement result, whether a beam failure event has occurred.
2. New candidate beam identification. The physical layer of the terminal measures a beam identification reference signal to find a new candidate beam. This step is not necessarily performed after a beam failure event occurs, or may be performed before a beam failure event.
3. Transmit beam failure recovery request (BFRQ) information.
4. The terminal monitors a response of a network device for a beam failure recovery request (UE monitors gNB response for beam failure recovery request).

In the BFR mechanism for a secondary cell, for a multi-carrier scenario (which may be understood as carrier aggregation (CA)), where there are a plurality of carriers or a plurality of component carriers (CC) or a plurality of cells, there is one primary cell (for example, a primary cell (PCell) in a master cell group (MCG), or a primary secondary cell (PSCell) in a secondary cell group (SCG)) and at least one secondary cell (SCell). The conclusions in the related art are as follows:

As for the scenario, any one of the following is included: a SCell with downlink and uplink; a SCell with DL only; and a PCell may be in a frequency range (FR) 1 or an FR2.

In terms of BFRQ information, in a case that there is only a downlink in the SCell (SCell with DL only), the terminal reports an index of a failed component carrier and new beam information on a physical uplink shared channel (PUSCH) or a physical uplink control channel (PUCCH). If a new candidate beam reference signal and a corresponding threshold are configured, and signal quality of at least a new beam is greater than or equal to the threshold, the terminal reports identified new beam information to the network device, and the terminal only reports a beam index of one new beam for one SCell. Before reporting the BFRQ information, the terminal may use a dedicated scheduling request (for example, a dedicated SR-like PUCCH resource) on the PCell or PSCell to trigger a PUSCH for the BFRQ.

After the beam failure recovery mechanism is introduced, the BFRQ information needs to be transmitted, so that uplink transmission in the related art further includes other information in addition to the BFRQ information, and how to perform transmission of the BFRQ information is still under further discussion.

SUMMARY

According to a first aspect, an embodiment of this disclosure provides a transmission method, applied to a terminal and including:

determining, based on a first priority relationship, third uplink information from first uplink information and second uplink information, where the first uplink information is first beam failure recovery request BFRQ information; and transmitting the third uplink information by using a first uplink resource.

According to a second aspect, an embodiment of this disclosure further provides a transmission method, applied to a network device and including:

receiving third uplink information transmitted by a terminal using a first uplink resource, where the third uplink information is uplink information determined by the terminal based on a first priority relationship from first uplink information and second uplink information, and the first uplink information is first beam failure recovery request BFRQ information.

According to a third aspect, an embodiment of this disclosure further provides a terminal, including:

a determining module, configured to determine, based on a first priority relationship, third uplink information from first uplink information and second uplink information, where the first uplink information is first beam failure recovery request BFRQ information; and a transmitting module, configured to transmit the third uplink information by using a first uplink resource.

According to a fourth aspect, an embodiment of this disclosure further provides a network device, including:

a receiving module, configured to receive third uplink information transmitted by a terminal using a first uplink resource, wherein the third uplink information is uplink information determined by the terminal based on a first priority relationship from first uplink information and second uplink information, and the first uplink information is first beam failure recovery request BFRQ information.

According to a fifth aspect, an embodiment of this disclosure further provides a terminal, including a memory, a processor, and a program stored in the memory and capable of running on the processor, where when the program is executed by the processor, the steps of the foregoing transmission method are implemented.

According to a sixth aspect, an embodiment of this disclosure further provides a network device, including a memory, a processor, and a program stored in the memory and capable of running on the processor, where when the program is executed by the processor, the steps of the foregoing transmission method are implemented.

According to a seventh aspect, an embodiment of this disclosure provides a computer-readable storage medium, where a computer program is stored in the computer-readable storage medium, and when the computer program is executed by a processor, the steps of the foregoing transmission method are implemented.

BRIEF DESCRIPTION OF DRAWINGS

FIG. 1 is a structural diagram of a network system to which an embodiment of this disclosure may be applied;

FIG. 2 is a flowchart of a transmission method according to an embodiment of this disclosure;

FIG. 3 is a flowchart of another transmission method according to an embodiment of this disclosure;

DESCRIPTION OF EMBODIMENTS

Figure 4:
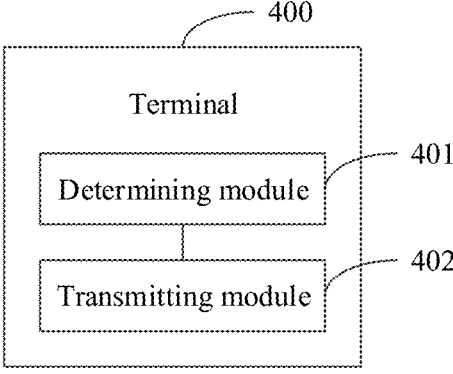
FIG. 4 is a structural diagram of a terminal according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms such as "an example" or "for example" are used to represent an example, an illustration, or a description. Any embodiment or design scheme described as "an example" or "for example" in the embodiments of this disclosure should not be construed as preferred or advantageous over other embodiments or design schemes. Specifically, the terms such as "an example" or "for example" are used to present related concepts in a specific manner.

The following describes embodiments of this disclosure with reference to the accompanying drawings. A transmission method, a terminal, and a network device provided in the embodiments of this disclosure may be applied to a wireless communications system. The wireless communications system may be a fifth generation (5G) system, or an evolved long term evolution (eLTE) system, or a later evolved communications system.

FIG. 1 is a structural diagram of a network system to which an embodiment of this disclosure may be applied. As shown in FIG. 1, the network system includes a terminal 11 and a network device 12. The terminal 11 may be user terminal or other terminal-side devices such as a mobile phone, a tablet personal computer, a laptop computer, a personal digital assistant (PDA), a mobile Internet device (MID), or a wearable device. It should be noted that a specific type of the terminal 11 is not limited in the embodiments of this disclosure. The network device 12 may be a 5G base station, a base station of a later version, or a base station in other communications systems, or may be referred to as a NodeB, an evolved NodeB, a transmission reception point (TRP), an access point (AP), or other terms in the field. As long as a same technical effect is achieved, the network device is not limited to a specific technical term. In addition, the network device 12 may be a master node (MN) or a secondary node (SN). It should be noted that, in the embodiments of this disclosure, the 5G base station is used as only an example, but the network device is not limited to any specific type.

FIG. 2 is a flowchart of a transmission method according to an embodiment of this disclosure. The method is applied to a terminal, and includes the following steps, as shown in FIG. 2.

Step 201. Determine, based on a first priority relationship, third uplink information from first uplink information and second uplink information, where the first uplink information is first beam failure recovery request BFRQ information; and Step 202. Transmit the third uplink information by using a first uplink resource.

In this embodiment of this disclosure, the first priority relationship is a priority relationship of the uplink information, and the uplink information may include BFRQ information and uplink information other than the BFRQ information (that is, non-BFRQ information). The first priority relationship is a preset priority relationship, and specifically may include a priority order between different BFRQ information, a priority order between BFRQ information and non-BFRQ information, and a priority order between non-BFRQ information.

Optionally, the third uplink information may include at least one of the following:

all or part of the first uplink information; and all or part of the second uplink information.

For example, uplink information with a highest priority may be determined based on the first priority relationship and transmitted as the third uplink information, uplink information that can be carried by a first uplink resource may also be determined first based on the first priority relationship to obtain the third uplink information, and uplink information with a relatively low priority that cannot be carried is discarded. Certainly, in addition to the first priority relationship, the third uplink information may further be determined based on factors such as a size of the first uplink resource and a size of the uplink information. Examples are not provided one by one herein.

In this embodiment, the first uplink resource refers to an uplink resource corresponding to an uplink grant, and the first uplink resource may be a physical uplink shared channel (PUSCH).

In this embodiment of this disclosure, a first priority relationship is set, and when there are first uplink information and second uplink information, uplink transmission is performed according to the first priority relationship, thereby providing a solution for uplink transmission when BFRQ information conflicts with other uplink information. In this way, this embodiment of this disclosure implements transmission of BFRQ information.

Optionally, the first BFRQ information is BFRQ information for a cell, BFRQ information for a bandwidth part BWP, or BFRQ information for a transmission reception point TRP.

It should be understood that in this embodiment, the BFRQ information may include at least one of the following: beam failure event indication information, an index of a cell, BWP or TRP in which a beam failure has occurred, and new beam information.

The TRP is be defined by at least one of the following:

a control resource set or a control resource set group;

an explicitly defined TRP;

a transmission configuration indication state, a transmission configuration indication state list, or a transmission configuration indication state pool;

Quasi co-location (QCL) information or QCL group information;

spatial relation information or spatial relation group information;

a PDCCH scrambling identifier or a PDCCH scrambling identifier group;

a physical downlink shared channel (PDSCH) scrambling identifier or a PDSCH scrambling identifier group;

a PDCCH configuration information element;

a PDSCH configuration information element; and a reference signal resource or a reference signal resource set.

It should be understood that the first uplink information may include one or more pieces of BFRQ information. In other words, the first uplink information may include BFRQ information for one or more cells; or, the first uplink information may include BFRQ information for one or more BWPs; or, the first uplink information may include BFRQ information for one or more TRPs.

Further, based on the foregoing embodiment, in this embodiment of this disclosure, the step 201 includes:

in a case that the first uplink information and the second uplink information cannot be transmitted at the same time on the first uplink resource, determining, based on the first priority relationship, the third uplink information from the first uplink information and the second uplink information.

In this embodiment, that the first uplink information and the second uplink information cannot be transmitted at the same time on the first uplink resource can be understood as that a resource size of the first uplink resource is not large enough to transmit the first uplink information and the second uplink information at the same time, and part of the uplink information needs to be discarded. Because only in a case that the first uplink information and the second uplink information cannot be transmitted at the same time on the first uplink resource, the uplink information to be transmitted is determined based on the first priority relationship, so that in a case that the first uplink information and the second uplink information can be transmitted at the same time on the first uplink resource, the first uplink information and the second uplink information may be transmitted directly on the first uplink resource, thereby reducing operation of the terminal.

In an optional embodiment, the BFRQ information is carried in a medium access control control element (MAC CE). Certainly, in other embodiments, the BFRQ information may further be carried in uplink control information (UCI) or radio resource control (RRC). The following embodiments use the BFRQ information carried in the MAC CE as an example for detailed description.

In this embodiment, different BFRQ information may be carried in different MAC CEs and one MAC CE is used for transmitting part or all of one piece of BFRQ information, or one MAC CE may transmit a plurality of pieces of or all BFRQ information.

Optionally, before the determining third uplink information from first information and second information based on a preset priority relationship, the method further includes:

in a case that a preset condition is met, triggering the first uplink information.

In this embodiment, the triggering the first uplink information may be understood as a behavior of triggering the terminal to generate the first uplink information, and after the triggering, the first uplink information may be packed and generated by a MAC layer or upper layer. The preset condition may include any one of the following:

determining that a beam failure event has occurred in a target object, where the target object is a cell, BWP or TRP; and determining that a beam failure event has occurred in a target object, and finding a new beam.

Specifically, the terminal may measure a beam failure detection reference signal (BFD RS), and determine, based on a measurement result, whether a beam failure event has occurred in at least one target object. In addition, the terminal measures a downlink reference signal for new candidate beam identification, to determine whether a new beam is found.

Further, specific content included in the first priority relationship may be set according to an actual requirement, which will be described in detail below.

In solution 1: the first priority relationship includes any one of the following:

a priority of the BFRQ information is higher than a priority of fourth uplink information, where the fourth uplink information is uplink information except the BFRQ information;

a priority of the BFRQ information is the same as a priority of target uplink information, where the target uplink information includes a C-RNTI MAC CE or data from UL-CCCH; and a priority of the BFRQ information is between a first priority and a second priority that are adjacent, where the first priority and the second priority are priorities corresponding to uplink information in the fourth uplink information.

It should be understood that the priority of the BFRQ information may determine a priority of a corresponding bearer object carrying the BFRQ information. In other words, in the solution 1, when the BFRQ information is carried in the MAC CE, a priority of a first MAC CE is higher than the priority of the fourth uplink information, where the first MAC CE is used for transmitting the BFRQ information;

the priority of the first MAC CE is the same as a priority of target uplink information, where the target uplink information includes a C-RNTI MAC CE or data from UL-CCCH; and the priority of the first MAC CE is between the first priority and the second priority that are adjacent, where the first priority and the second priority are priorities corresponding to uplink information in the fourth uplink information.

In solution 2: the first priority relationship includes at least one of the following:

a priority of BFRQ information for a primary cell or a primary secondary cell is greater than that of BFRQ information for a secondary cell; and a priority relationship among different BFRQ information determined based on cell information, where the different BFRQ information is BFRQ information for different secondary cells.

It should be understood that the priority of the BFRQ information may determine a priority of a corresponding bearer object carrying the BFRQ information. In other words, in the solution 2, when all or part of one piece of BFRQ information is included in a MAC CE, at least one of the following priority relationships exists for different MAC CEs:

a priority of a second MAC CE is greater than a priority of a third MAC CE, where the second MAC CE is used for transmitting BFRQ information for a primary cell or a primary secondary cell, the third MAC CE is used for transmitting BFRQ information for a secondary cell, and the second MAC CE is different from the third MAC CE; and a priority relationship among different MAC CEs determined based on cell information, where the different MAC CEs are used for transmitting BFRQ information for different secondary cells.

When a plurality of pieces of BFRQ information are included in one MAC CE, at least one of the following priority relationships exists for the plurality of pieces of BFRQ information:

a priority of BFRQ information for a primary cell or a primary secondary cell is greater than that of BFRQ information for a secondary cell; and a priority relationship among different BFRQ information determined based on cell information.

In this embodiment, the cell information may include a cell index, a cell type, or other cell information. Taking the cell index as an example, for MAC CEs for BFRQ (MAC CEs for transmitting BFRQ information) that are associated with a plurality of secondary cells, a high-to-low order of priorities of the MAC CEs for BFRQ that are associated with the plurality of secondary cells is based on an ascending or descending order of cell indexes of the secondary cells.

In this embodiment, taking the secondary cell type as an example, for MAC CEs for BFRQ that are associated with a plurality of SCells, a high-to-low order of priorities of MAC CEs for BFRQ that are associated with the plurality of SCells is determined based on the SCell type, for example, a priority of a MAC CE for BFRQ that is associated with a PUCCH SCell and/or a secondary timing advance group downlink timing reference cell (STAG DL timing reference SCell) is higher than priorities of MAC CEs for BFRQ that are associated with other SCells.

In solution 3: the first priority relationship includes a priority relationship among different BFRQ information determined based on BWP information or TRP information.

It should be understood that the priority of the BFRQ information may determine a priority of a corresponding bearer object carrying the BFRQ information. In other words, in the solution 3, when all or part of one piece of BFRQ information is included in a MAC CE, a priority relationship among different MAC CEs may be determined based on the BWP information or the TRP information.

When at least two pieces of BFRQ information are included in one MAC CE, a priority relationship among or between the at least two pieces of BFRQ information may be determined based on the BWP information or the TRP information.

The BWP information may include a BWP index, a BWP type, or other BWP information. The TRP information may include a TRP index, a TRP type, or other TRP information. In this embodiment, the BWP type may include an initial BWP, a default BWP, and the like.

In this embodiment of this disclosure, when at least two pieces of BFRQ information are included in one MAC CE, it may be understood that: all BFRQ information is included in the same MAC CE.

Any one of the solutions 1 to 3 may be implemented as a separate embodiment, and the solution 1 may also be implemented in combination with the solution 2 or solution 3.

Optionally, in an optional embodiment, an uplink resource for the first uplink information at least partially overlaps an uplink resource for the second uplink information.

In other words, in this embodiment, the first uplink information conflicts with the second uplink information. Specifically, when the uplink resource for the first uplink information at least partially overlaps the uplink resource for the second uplink information, the first uplink resource is determined based on a second priority relationship.

In an optional embodiment, the second priority relationship includes at least one of the following:

a priority of a first uplink grant resource is higher than a priority of a second uplink grant resource, where the first uplink grant resource is an uplink grant resource for a primary cell or a primary secondary cell, and the second uplink grant resource is an uplink grant resource for a secondary cell;

a priority of a third uplink grant resource is higher than a priority of a fourth uplink grant resource, where the third uplink grant resource is an uplink grant resource for a secondary cell in which no beam failure event has occurred, and the fourth uplink grant resource is an uplink grant resource for a secondary cell in which a beam failure event has occurred;

a priority order of an uplink grant resource for a MAC CE for BFRQ, an uplink grant resource of a configured grant, an uplink grant resource in a random access (RA) procedure, and a dynamically granted uplink grant resource;

a priority of a fifth uplink grant resource is greater than a priority of a sixth uplink grant resource, where payload of the fifth uplink grant resource is greater than payload of the sixth uplink grant resource;

a priority of a seventh uplink grant resource is greater than a priority of an eighth uplink grant resource, where latency of the seventh uplink grant resource is less than latency of the eighth uplink grant resource; and a priority of a ninth uplink grant resource is greater than a priority of a tenth uplink grant resource, where reliability of the ninth uplink grant resource is higher than reliability of the tenth uplink grant resource.

Optionally, the random access procedure may specifically refer to a 2-step random access procedure or a 4-step random access procedure. Accordingly, an uplink grant resource in the random access procedure refers to: a PUSCH in the 2-step random access (2-step RA) procedure or a PUSCH in the 4-step random access (4-step RA) procedure.

In this embodiment of this disclosure, when the second priority relationship includes at least two of the above, a multi-level priority relationship exists, and a two-level priority relationship is taken as an example for description. For example, the second priority relationship includes the priority relationship of the first item (that is, the priority of the first uplink grant resource is higher than the priority of the second uplink grant resource) and the priority relationship of the fourth item (the priority of the fifth uplink grant resource is greater than the priority of the sixth uplink grant resource). In an embodiment, prioritization may be performed first based on the priority relationship of the fourth item, and then performed based on the priority relationship of the first item.

In another embodiment, prioritization may be performed first based on the priority relationship of the first item, and then performed based on the priority relationship of the fourth item.

Further, the second uplink information includes at least one of the following:

a C-RNTI MAC CE or data from UL-CCCH;

a MAC CE for transmitting a configured grant confirmation;

a MAC CE for transmitting a first buffer status report BSR, where the first BSR includes no BSR for padding;

a MAC CE for transmitting a single entry power headroom report or a MAC CE for transmitting a multiple entry power headroom report;

data from any logical channel except the UL-CCCH;

a MAC CE for transmitting a recommended bit rate query;

a MAC CE for transmitting a second BSR, where the second BSR includes a BSR for padding; and a MAC CE for transmitting second BFRQ information, where the MAC CE that transmits the second BFRQ information is the same as or different from the MAC CE that transmits the first BFRQ information.

In this embodiment, the second uplink information may be understood to include BFRQ information and/or uplink information other than the BFRQ information. The second uplink information may be uplink information for a cell, uplink information for BWP, or uplink information for a TRP. The cell may be a primary cell, a primary secondary cell, or a secondary cell.

To help better understand this disclosure, the following describes in detail a specific implementation process of this disclosure by using an example in which a target object associated with the BFRQ information is a cell and the BFRQ information is carried in a MAC CE. Specifically, the process may include the following steps.

Step 1. A terminal measures a BFD RS, and determines, based on a measurement result, whether a beam failure event has occurred in at least one target object.

Step 2. The terminal measures a downlink reference signal for new candidate beam identification (DL RS for new beam identification), to determine whether a new beam (new beam) is found. There is no sequential order between the step 2 and step 1.

Step 3. The terminal generates a first MAC CE for BFRQ. A condition to trigger the first MAC CE that transmits a BFRQ may be at least one of the following:

in step 1, the UE determines that a beam failure event has occurred in at least one cell; and in step 1, the UE determines that a beam failure event has occurred in at least one cell, and a new beam is found by the UE in the step 2.

All BFRQs (for example, BFRQs of all cells in which a beam failure has occurred) may be carried in one MAC CE, or one BFRQ is carried in one MAC CE.

Step 4. The terminal determines a first uplink resource for transmitting the first MAC CE. The first uplink resource is an uplink resource corresponding to an uplink grant, and the first uplink resource may be a PUSCH.

Step 5. In a case that a conflict occurs between the second uplink information and the first MAC CE, the first priority relationship is used to determine the uplink information transmitted on the first uplink resource (that is, the third uplink information).

The second uplink information includes at least one of the following:

a C-RNTI MAC CE or data from UL-CCCH;

a MAC CE for transmitting a configured grant confirmation (Configured Grant Confirmation MAC CE);

a MAC CE for transmitting a first buffer status report BSR, where the first BSR includes no BSR for padding (MAC CE for BSR, with exception of BSR included for padding);

a MAC CE for transmitting a single entry power headroom report or a MAC CE for transmitting a multiple entry power headroom report (Single Entry PHR MAC CE or Multiple Entry PHR MAC CE);

data from any logical channel except the UL-CCCH (data from any Logical Channel, except data from UL-CCCH);

a MAC CE for transmitting a recommended bit rate query (MAC CE for Recommended bit rate query);

a MAC CE for transmitting a second BSR, where the second BSR includes a BSR for padding (MAC CE for BSR included for padding); and a MAC CE for transmitting second BFRQ information, where the MAC CE that transmits the second BFRQ information is the same as or different from the MAC CE that transmits the first BFRQ information.

Further, a cell corresponding to the second uplink information includes a primary cell, a primary secondary cell, or a secondary cell.

Further, the conflict can alternatively be understood as a complete or partial overlap between the uplink resource for the second uplink information and the uplink resource for the first MAC CE.

The first priority relationship includes at least one of the following:

the MAC CE for BFRQ has the highest priority, that is, the priority of the MAC CE for BFRQ is higher than the priority corresponding to non-BFRQ information in the related art;

the MAC CE for BFRQ has a same priority as the C-RNTI MAC CE or data from UL-CCCH; and the priority of the MAC CE for BFRQ is between the first priority and the second priority that are adjacent, where the first priority and the second priority are priorities corresponding to non-BFRQ information.

Further, the first priority relationship further includes at least one of the following:

a priority of the MAC CE for BFRQ that is associated with a PCell or a PSCell is higher than a priority of a MAC CE for BFRQ that is associated with a SCell;

for MAC CEs for BFRQ that are associated with a plurality of SCells, a high-to-low order of priorities of the MAC CEs for BFRQ that are associated with the plurality of SCells is based on an ascending or descending order of cell indexes of the SCells; and for MAC CEs for BFRQ that are associated with a plurality of SCells, a high-to-low order of priorities of MAC CEs for BFRQ that are associated with the plurality of SCells is determined based on the SCell type, for example, a priority of a MAC CE for BFRQ that is associated with a PUCCH SCell and/or a secondary timing advance group downlink timing reference cell (STAG DL timing reference SCell) is higher than priorities of MAC CEs for BFRQ that are associated with other SCells.

Further, in a case that a conflict occurs between the second uplink information and the first MAC CE, the third uplink information may be determined in the following manners.

Manner 1: Send uplink information with the highest priority, and discard other uplink information.

Manner 2: Based on a priority relationship, determine uplink information that can be carried in an uplink resource, and transmit the uplink information on the uplink resource. Discard low-priority uplink information that cannot be carried.

Manner 3: Based on factors such as a priority relationship, a size of an uplink resource, and a size of uplink information, determine uplink information that can be carried in the uplink resource, and transmit the uplink information on the uplink resource. Discard low-priority uplink information that cannot be carried.

Step 6. The terminal uses the first uplink resource to transmit the above determined third uplink information to a network device.

FIG. 3 is a flowchart of another transmission method according to an embodiment of this disclosure. The method is applied to a network device. As shown in FIG. 3, the method includes the following steps.

Step 301. Receive third uplink information transmitted by a terminal using a first uplink resource, where the third uplink information is uplink information determined by the terminal based on a first priority relationship from first uplink information and second uplink information, and the first uplink information is first beam failure recovery request BFRQ information.

Optionally, the third uplink information includes at least one of the following:

all or part of the first uplink information; and all or part of the second uplink information.

Optionally, the first BFRQ information is BFRQ information for a cell, BFRQ information for a bandwidth part BWP, or BFRQ information for a transmission reception point TRP.

Optionally, the BFRQ information is carried in a medium access control control element MAC CE.

Optionally, the first priority relationship includes any one of the following:

a priority of the BFRQ information is higher than a priority of fourth uplink information, where the fourth uplink information is uplink information except the BFRQ information;

a priority of the BFRQ information is the same as a priority of target uplink information, where the target uplink information includes a C-RNTI MAC CE or data from UL-CCCH; and a priority of the BFRQ information is between a first priority and a second priority that are adjacent, where the first priority and the second priority are priorities corresponding to uplink information in the fourth uplink information.

Optionally, the first priority relationship includes at least one of the following:

a priority of BFRQ information for a primary cell or a primary secondary cell is greater than that of BFRQ information for a secondary cell; and a priority relationship among different BFRQ information determined based on cell information, where the different BFRQ information is BFRQ information for different secondary cells.

Optionally, the first priority relationship includes a priority relationship among different BFRQ information determined based on BWP information or TRP information.

Optionally, the second uplink information includes at least one of the following:

a C-RNTI MAC CE or data from UL-CCCH;

a MAC CE for transmitting a configured grant confirmation;

a MAC CE for transmitting a first buffer status report BSR, where the first BSR includes no BSR for padding;

a MAC CE for transmitting a single entry power headroom report or a MAC CE for transmitting a multiple entry power headroom report;

data from any logical channel except the UL-CCCH;

a MAC CE for transmitting a recommended bit rate query;

a MAC CE for transmitting a second BSR, where the second BSR includes a BSR for padding; and a MAC CE for transmitting second BFRQ information, where the MAC CE that transmits the second BFRQ information is the same as or different from the MAC CE that transmits the first BFRQ information.

Optionally, an uplink resource for the first uplink information at least partially overlaps an uplink resource for the second uplink information.

Optionally, when the uplink resource for the first uplink information at least partially overlaps the uplink resource for the second uplink information, the first uplink resource is determined based on a second priority relationship.

Optionally, the second priority relationship includes at least one of the following:

a priority of a first uplink grant resource is higher than a priority of a second uplink grant resource, where the first uplink grant resource is an uplink grant resource for a primary cell or a primary secondary cell, and the second uplink grant resource is an uplink grant resource for a secondary cell;

a priority of a third uplink grant resource is higher than a priority of a fourth uplink grant resource, where the third uplink grant resource is an uplink grant resource for a secondary cell in which no beam failure event has occurred, and the fourth uplink grant resource is an uplink grant resource for a secondary cell in which a beam failure event has occurred;

a priority order of an uplink grant resource for a MAC CE for BFRQ, an uplink grant resource of a configured grant, an uplink grant resource in a random access RA procedure, and a dynamically granted uplink grant resource;

a priority of a fifth uplink grant resource is greater than a priority of a sixth uplink grant resource, where payload of the fifth uplink grant resource is greater than payload of the sixth uplink grant resource;

a priority of a seventh uplink grant resource is greater than a priority of an eighth uplink grant resource, where latency of the seventh uplink grant resource is less than latency of the eighth uplink grant resource; and a priority of a ninth uplink grant resource is greater than a priority of a tenth uplink grant resource, where reliability of the ninth uplink grant resource is higher than reliability of the tenth uplink grant resource.

Optionally, the second uplink information is uplink information for a cell, uplink information for a BWP, or uplink information for a TRP.

Optionally, the cell is a primary cell, a primary secondary cell, or a secondary cell.

It should be noted that this embodiment is used as an embodiment of a network device corresponding to the embodiment shown in FIG. 2, and for specific implementations of this embodiment, reference may be made to the relevant descriptions about the embodiment shown in FIG. 2, and the same beneficial effect is achieved. To avoid repetition, details are not described herein again.

FIG. 4 is a structural diagram of a terminal according to an embodiment of this disclosure. As shown in FIG. 4, the terminal 400 includes:

a determining module 401, configured to determine, based on a first priority relationship, third uplink information from first uplink information and second uplink information, where the first uplink information is first beam failure recovery request BFRQ information; and a transmitting module 402, configured to transmit the third uplink information by using a first uplink resource.

Optionally, the third uplink information includes at least one of the following:

all or part of the first uplink information; and all or part of the second uplink information.

Optionally, the first BFRQ information is BFRQ information for a cell, BFRQ information for a bandwidth part BWP, or BFRQ information for a transmission reception point TRP.

Optionally, the determining module 401 is specifically configured to: in a case that the first uplink information and the second uplink information cannot be transmitted at the same time on the first uplink resource, determine, based on the first priority relationship, the third uplink information from the first uplink information and the second uplink information.

Optionally, the first BFRQ information is carried in a medium access control control element MAC CE.

Optionally, the first priority relationship includes any one of the following:

a priority of the BFRQ information is higher than a priority of fourth uplink information, where the fourth uplink information is uplink information except the BFRQ information;

a priority of the BFRQ information is the same as a priority of target uplink information, where the target uplink information includes a C-RNTI MAC CE or data from UL-CCCH; and a priority of the BFRQ information is between a first priority and a second priority that are adjacent, where the first priority and the second priority are priorities corresponding to uplink information in the fourth uplink information.

Optionally, the first priority relationship includes at least one of the following:

a priority of BFRQ information for a primary cell or a primary secondary cell is greater than that of BFRQ information for a secondary cell; and a priority relationship among different BFRQ information determined based on cell information, where the different BFRQ information is BFRQ information for different secondary cells.

Optionally, the first priority relationship includes a priority relationship among different BFRQ information determined based on BWP information or TRP information.

Optionally, the second uplink information includes at least one of the following:

a C-RNTI MAC CE or data from UL-CCCH;

a MAC CE for transmitting a configured grant confirmation;

a MAC CE for transmitting a first buffer status report BSR, where the first BSR includes no BSR for padding;

a MAC CE for transmitting a single entry power headroom report or a MAC CE for transmitting a multiple entry power headroom report;

data from any logical channel except the UL-CCCH;

a MAC CE for transmitting a recommended bit rate query;

a MAC CE for transmitting a second BSR, where the second BSR includes a BSR for padding; and a MAC CE for transmitting second BFRQ information, where the MAC CE that transmits the second BFRQ information is the same as or different from the MAC CE that transmits the first BFRQ information.

Optionally, an uplink resource for the first uplink information at least partially overlaps an uplink resource for the second uplink information.

Optionally, when the uplink resource for the first uplink information at least partially overlaps the uplink resource for the second uplink information, the first uplink resource is determined based on a second priority relationship.

Optionally, the second priority relationship includes at least one of the following:

a priority of a first uplink grant resource is higher than a priority of a second uplink grant resource, where the first uplink grant resource is an uplink grant resource for a primary cell or a primary secondary cell, and the second uplink grant resource is an uplink grant resource for a secondary cell;

a priority of a third uplink grant resource is higher than a priority of a fourth uplink grant resource, where the third uplink grant resource is an uplink grant resource for a secondary cell in which no beam failure event has occurred, and the fourth uplink grant resource is an uplink grant resource for a secondary cell in which a beam failure event has occurred;

a priority order of an uplink grant resource for a MAC CE for BFRQ, an uplink grant resource of a configured grant, an uplink grant resource in a random access RA procedure, and a dynamically granted uplink grant resource;

a priority of a fifth uplink grant resource is greater than a priority of a sixth uplink grant resource, where payload of the fifth uplink grant resource is greater than payload of the sixth uplink grant resource;

a priority of a seventh uplink grant resource is greater than a priority of an eighth uplink grant resource, where latency of the seventh uplink grant resource is less than latency of the eighth uplink grant resource; and a priority of a ninth uplink grant resource is greater than a priority of a tenth uplink grant resource, where reliability of the ninth uplink grant resource is higher than reliability of the tenth uplink grant resource.

Optionally, the second uplink information is uplink information for a cell, uplink information for a BWP, or uplink information for a TRP.

Optionally, the cell is a primary cell, a primary secondary cell, or a secondary cell.

The terminal provided by this embodiment of this disclosure can implement the processes implemented by the terminal in the method embodiment in FIG. 2. To avoid repetition, details are not described herein again.

Figure 5:
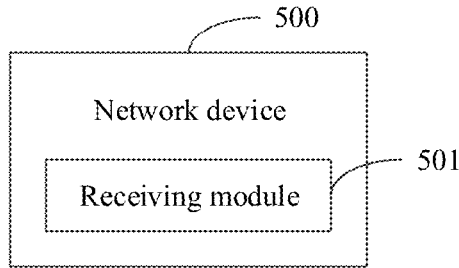
FIG. 5 is a structural diagram of a network device according to an embodiment of this disclosure.

FIG. 5 is a structural diagram of a network device according to an embodiment of this disclosure. As shown in FIG. 5, the network device 500 includes:

a receiving module 501, configured to receive third uplink information transmitted by a terminal using a first uplink resource, where the third uplink information is uplink information determined by the terminal based on a first priority relationship from first uplink information and second uplink information, and the first uplink information is first beam failure recovery request BFRQ information.

Optionally, the third uplink information includes at least one of the following:

all or part of the first uplink information; and all or part of the second uplink information.

Optionally, the first BFRQ information is BFRQ information for a cell, BFRQ information for a bandwidth part BWP, or BFRQ information for a transmission reception point TRP.

Optionally, the first BFRQ information is carried in a medium access control control element MAC CE.

Optionally, the first priority relationship includes any one of the following:

a priority of the BFRQ information is higher than a priority of fourth uplink information, where the fourth uplink information is uplink information except the BFRQ information;

a priority of the BFRQ information is the same as a priority of target uplink information, where the target uplink information includes a C-RNTI MAC CE or data from UL-CCCH; and a priority of the BFRQ information is between a first priority and a second priority that are adjacent, where the first priority and the second priority are priorities corresponding to uplink information in the fourth uplink information.

Optionally, the first priority relationship includes at least one of the following:

a priority of BFRQ information for a primary cell or a primary secondary cell is greater than that of BFRQ information for a secondary cell; and a priority relationship among different BFRQ information determined based on cell information, where the different BFRQ information is BFRQ information for different secondary cells.

Optionally, the first priority relationship includes a priority relationship among different BFRQ information determined based on BWP information or TRP information.

Optionally, the second uplink information includes at least one of the following:

a C-RNTI MAC CE or data from UL-CCCH;

a MAC CE for transmitting a configured grant confirmation;

a MAC CE for transmitting a first buffer status report BSR, where the first BSR includes no BSR for padding;

a MAC CE for transmitting a single entry power headroom report or a MAC CE for transmitting a multiple entry power headroom report;

data from any logical channel except the UL-CCCH;

a MAC CE for transmitting a recommended bit rate query;

a MAC CE for transmitting a second BSR, where the second BSR includes a BSR for padding; and a MAC CE for transmitting second BFRQ information, where the MAC CE that transmits the second BFRQ information is the same as or different from the MAC CE that transmits the first BFRQ information.

Optionally, an uplink resource for the first uplink information at least partially overlaps an uplink resource for the second uplink information.

Optionally, when the uplink resource for the first uplink information at least partially overlaps the uplink resource for the second uplink information, the first uplink resource is determined based on a second priority relationship.

Optionally, the second priority relationship includes at least one of the following:

a priority of a first uplink grant resource is higher than a priority of a second uplink grant resource, where the first uplink grant resource is an uplink grant resource for a primary cell or a primary secondary cell, and the second uplink grant resource is an uplink grant resource for a secondary cell;

a priority of a third uplink grant resource is higher than a priority of a fourth uplink grant resource, where the third uplink grant resource is an uplink grant resource for a secondary cell in which no beam failure event has occurred, and the fourth uplink grant resource is an uplink grant resource for a secondary cell in which a beam failure event has occurred;

a priority order of an uplink grant resource for a MAC CE for BFRQ, an uplink grant resource of a configured grant, an uplink grant resource in a random access RA procedure, and a dynamically granted uplink grant resource;

a priority of a fifth uplink grant resource is greater than a priority of a sixth uplink grant resource, where payload of the fifth uplink grant resource is greater than payload of the sixth uplink grant resource;

a priority of a seventh uplink grant resource is greater than a priority of an eighth uplink grant resource, where latency of the seventh uplink grant resource is less than latency of the eighth uplink grant resource; and a priority of a ninth uplink grant resource is greater than a priority of a tenth uplink grant resource, where reliability of the ninth uplink grant resource is higher than reliability of the tenth uplink grant resource.

Optionally, the second uplink information is uplink information for a cell, uplink information for a BWP, or uplink information for a TRP.

Optionally, the cell is a primary cell, a primary secondary cell, or a secondary cell.

The network device provided in this embodiment of this disclosure can implement each process implemented by the network device in the method embodiment in FIG. 3. To avoid repetition, details are not described herein again.

Figure 6:
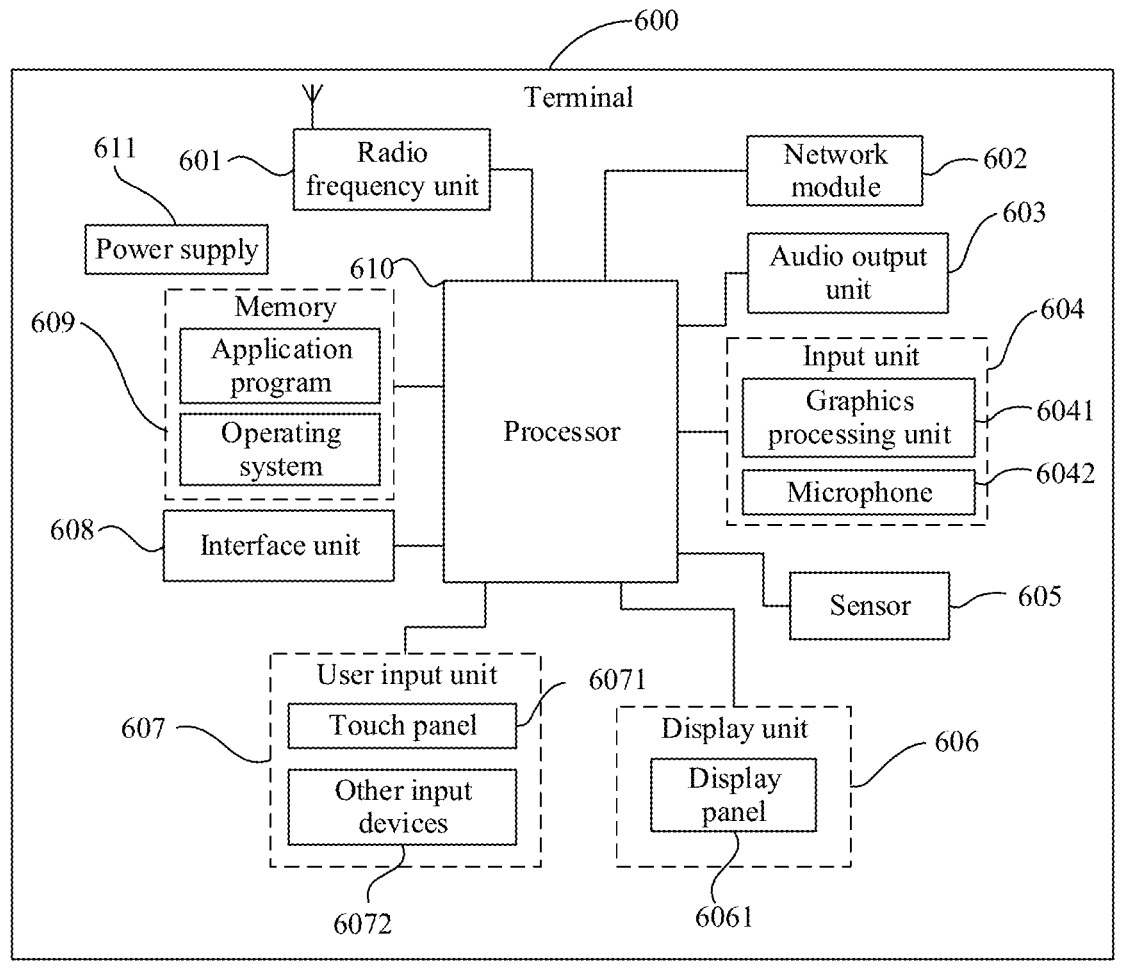
FIG. 6 is a structural diagram of another terminal according to an embodiment of this disclosure.

FIG. 6 is a schematic diagram of a hardware structure of a terminal for implementing the embodiments of this disclosure.

The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute any limitation on the terminal. The terminal may include more or fewer components than those shown in the figure, or a combination of some components, or the components disposed differently. In this embodiment of this disclosure, the terminal includes but is not limited to a mobile phone, a tablet computer, a notebook computer, a palmtop computer, an in-vehicle terminal, a wearable device, a pedometer, or the like.

The processor 610 is configured to determine, based on a first priority relationship, third uplink information from first uplink information and second uplink information, where the first uplink information is first beam failure recovery request BFRQ information.

The radio frequency unit 601 is configured to transmit the third uplink information by using a first uplink resource.

In this embodiment of this disclosure, a first priority relationship is set, and when there are first uplink information and second uplink information, uplink transmission is performed according to the first priority relationship, thereby providing a solution for uplink transmission when BFRQ information conflicts with other uplink information. In this way, this embodiment of this disclosure implements transmission of BFRQ information.

It should be understood that, in this embodiment of this disclosure, the radio frequency unit 601 may be configured to transmit or receive a signal in an information transmitting/receiving or call process. Specifically, the radio frequency unit 601 receives downlink data from a base station, transmits the downlink data to the processor 610 for processing, and transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides a user with wireless broadband internet access through the network module 602, for example, helping the user to transmit and receive e-mails, browse web pages, and access streaming media.

The audio output unit 603 may convert audio data received by the radio frequency unit 601 or the network module 602 or stored in the memory 609 into an audio signal, and output the audio signal as a sound. In addition, the audio output unit 603 may further provide audio output (for example, a call signal reception tone or a message reception tone) that is related to a specific function performed by the terminal 600. The audio output unit 603 includes a speaker, a buzzer, a receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or transmitted by the radio frequency unit 601 or the network module 602. The microphone 6042 can receiving sounds and processing such sounds into audio data. The processed audio data may be converted in a telephone call mode into a format that can be transmitted by the radio frequency unit 601 to a mobile communications base station, for outputting.

The terminal 600 further includes at least one sensor 605, for example, an optical sensor, a motion sensor, and other sensors. Specifically, the optical sensor may include an ambient light sensor and a proximity sensor. The ambient light sensor may adjust luminance of the display panel 6061 based on brightness of ambient light, and the proximity sensor may turn off a display panel 6061 and/or backlight when the terminal 600 moves close to an ear. As a motion sensor, an accelerometer sensor may detect a value of an acceleration in various directions (there are usually three axes), may detect a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 605 may further include a fingerprint sensor, a pressure sensor, an iris sensor, a molecular sensor, a gyroscope, a barometer, a hygrometer, a thermometer, or an infrared sensor. Details are not described herein.

The display unit 606 is configured to display information input by the user or information provided for the user. The display unit 606 may include the display panel 6061. The display panel 6061 may be configured in a form of a liquid crystal display (LCD), an organic light-emitting diode (OLED), or the like.

The user input unit 607 may be used to receive input digit or character information, and generate key signal input that is related to user setting and function control of the terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using a finger or any appropriate object or accessory such as a stylus). The touch panel 6071 may include two parts: a touch detection apparatus and a touch controller. The touch detection apparatus detects a touch position of the user, detects a signal carried by a touch operation, and transmits the signal to the touch controller. The touch controller receives touch information from the touch detection apparatus, converts the touch information into point coordinates, transmits the point coordinates to the processor 610, and receives and executes a command transmitted by the processor 610. In addition, the touch panel 6071 may be implemented in a plurality of forms, for example, as a resistive, capacitive, infrared, or surface acoustic wave touch panel. In addition to the touch panel 6071, the user input unit 607 may further include other input devices 6072. Specifically, the other input devices 6072 may include but are not limited to a physical keyboard, a function key (for example, a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 for determining a type of the touch event. Then, the processor 610 provides a corresponding visual output on the display panel 6061 based on the type of the touch event. Although in FIG. 6, the touch panel 6071 and the display panel 6061 act as two independent parts to implement input and output functions of the terminal, in some embodiments, the touch panel 6071 and the display panel 6061 may be integrated to implement the input and output functions of the terminal. This is not specifically limited herein.

The interface unit 608 is an interface for connecting an external apparatus to the terminal 600. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 608 may be used to receive input (for example, data information and electric power) from the external apparatus, and transmit the received input to one or more elements in the terminal 600; or may be used to transmit data between the terminal 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, and may further include a non-volatile memory such as a disk storage device, a flash memory device, or another volatile solid-state storage device.

The processor 610 is a control center of the terminal, and is connected to all components of the terminal by using various interfaces and lines. By running or executing a software program and/or a module stored in the memory 609 and invoking data stored in the memory 609, the processor 610 executes various functions of the terminal and processes data, so as to perform overall monitoring on the terminal. The processor 610 may include one or more processing units. Optionally, the processor 610 may integrate an application processor and a modem processor. The application processor mainly processes an operating system, a user interface, an application program, and the like. The modem processor mainly processes wireless communication. It can be understood that the modem processor may alternatively be not integrated in the processor 610.

The terminal 600 may further include a power supply 611 (for example, a battery) that supplies power to the components. Optionally, the power supply 611 may be logically connected to the processor 610 by using a power management system, so as to implement functions such as charging management, discharging management, and power consumption management by using the power management system.

In addition, the terminal 600 includes some functional modules that are not shown. Details are not described herein again.

Optionally, an embodiment of this disclosure further provides a terminal, including a processor 610, a memory 609, and a computer program stored in the memory 609 and capable of running on the processor 610. When the computer program is executed by the processor 610, the processes of the foregoing transmission method embodiments are implemented, with the same technical effects achieved. To avoid repetition, details are not described herein again.

Figure 7:
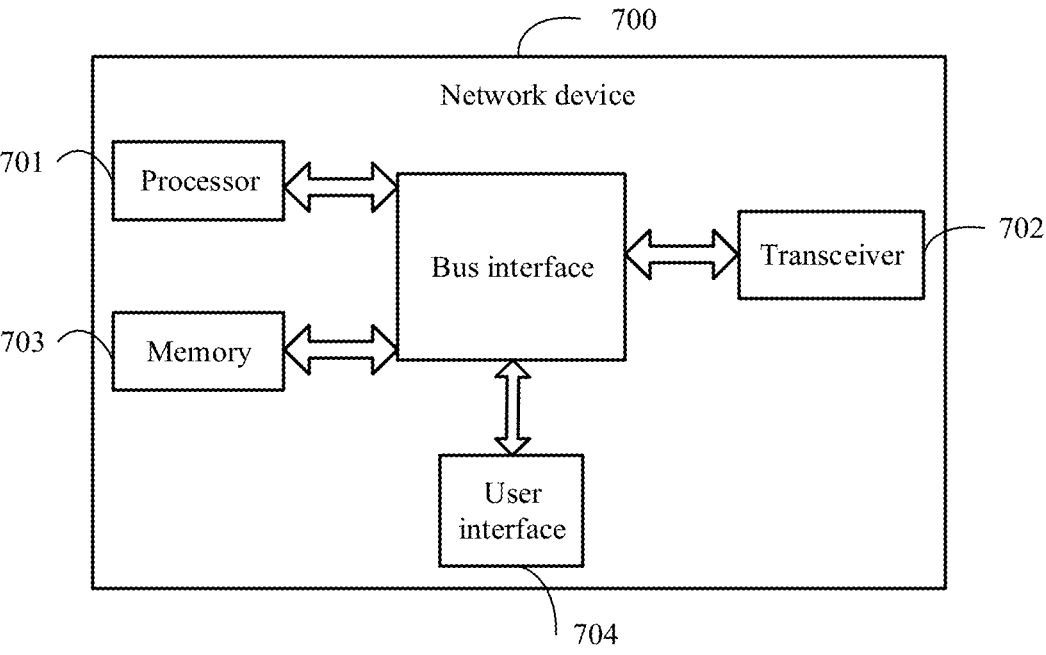
FIG. 7 is a structural diagram of another network device according to an embodiment of this disclosure.

FIG. 7 is a structural diagram of another network device according to an embodiment of this disclosure. As shown in FIG. 7, the network device 700 includes a processor 701, a transceiver 702, a memory 703, and a bus interface.

The transceiver 702 is configured to receive third uplink information transmitted by a terminal using a first uplink resource, where the third uplink information is uplink information determined by the terminal based on a first priority relationship from first uplink information and second uplink information, and the first uplink information is first beam failure recovery request BFRQ information.

In this embodiment of this disclosure, a first priority relationship is set, and when there are first uplink information and second uplink information, uplink transmission is performed according to the first priority relationship, thereby providing a solution for uplink transmission when BFRQ information conflicts with other uplink information. In this way, this embodiment of this disclosure implements transmission of BFRQ information.

In FIG. 7, a bus architecture may include any quantity of interconnected buses and bridges, specifically for interconnecting various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides interfaces. The transceiver 702 may be a plurality of components, including a transmitter and a receiver, and provides units for communicating with a variety of other apparatuses on a transmission medium. For different user equipment, the user interface 704 may also be an interface capable of externally or internally connecting a required device, and the connected device includes but is not limited to a keypad, a display, a speaker, a microphone, a joystick, and the like.

The processor 701 is responsible for management of the bus architecture and general processing, and the memory 703 may store data used by the processor 701 when the processor 701 performs an operation.

Optionally, an embodiment of this disclosure further provides a network device, including a processor 701, a memory 703, and a computer program stored in the memory 703 and capable of running on the processor 701. When the computer program is executed by the processor 701, the processes of the foregoing transmission method embodiments are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the transmission method embodiment on a network device side according to the embodiments of this disclosure are implemented, or when the computer program is executed by a processor, the processes of the transmission method embodiment on a terminal side according to the embodiments of this disclosure are implemented, with the same technical effects achieved. To avoid repetition, details are not described herein again. For example, the computer-readable storage medium is a read-only memory (ROM), a random access memory RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the methods described in the embodiments of this disclosure.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable medium. Based on such an understanding, the technical solutions of this disclosure essentially, or the part contributing to the related art may be implemented in a form of a software product. The software product is stored in a storage medium, and includes several instructions for instructing a computer device (which may be a personal computer, a server, a network device, or the like) to perform all or some of the steps of the methods described in the embodiments of this disclosure. The storage medium includes: any medium that can store program code, such as a USB flash drive, a removable hard disk, a ROM, a RAM, a magnetic disk, or an optical disc.

A person of ordinary skill in the art may understand that all or some of the processes of the methods in the embodiments may be implemented by a computer program controlling relevant hardware. The program may be stored in a computer-readable storage medium. When the program runs, the processes of the methods in the embodiments are performed. The storage medium may be a magnetic disk, an optical disc, a read-only memory (ROM), a random access memory (RAM), or the like.

It may be understood that the embodiments described in the embodiments of this disclosure may be implemented by hardware, software, firmware, middleware, microcode, or a combination thereof. In implementation by hardware, modules, units, and subunits may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, other electronic units used to implement the functions described in this disclosure, or a combination thereof.

For software implementation, the technologies described in the embodiments of this disclosure may be implemented by modules (for example, processes or functions) that perform the functions described in the embodiments of this disclosure. Software code may be stored in the memory and executed by the processor. The memory may be implemented in the processor or external to the processor.

The foregoing describes the embodiments of this disclosure with reference to the accompanying drawings. However, this disclosure is not limited to the foregoing specific implementations. The foregoing specific implementations are merely illustrative rather than restrictive. In light of this disclosure, a person of ordinary skill in the art may develop many other forms without departing from principles of this disclosure and the protection scope of the claims, and all such forms shall fall within the protection scope of this disclosure.

What is claimed is:

1. A transmission method, comprising:
determining, by a terminal, based on a first priority relationship, third uplink information from first uplink information and second uplink information, wherein the first uplink information is first beam failure recovery request (BFRQ) information; and transmitting, by the terminal, the third uplink information by using a first uplink resource;

wherein the second uplink information comprises at least one of the following:

a C-RNTI MAC CE;

a MAC CE for transmitting a configured grant confirmation;

a MAC CE for transmitting a single entry power headroom report or a MAC CE for transmitting a multiple entry power headroom report;

a MAC CE for transmitting a recommended bit rate query; or a MAC CE for transmitting second BFRQ information, wherein the MAC CE that transmits the second BFRQ information is the same as or different from the MAC CE that transmits the first BFRQ information;

wherein the BFRQ information is carried in a medium access control control element (MAC CE);

wherein the determining by the terminal, based on a first priority relationship, third uplink information from first uplink information and second uplink information comprises:

in a case that the first uplink information and the second uplink information cannot be transmitted at the same time on the first uplink resource, determining, by the terminal, based on the first priority relationship, the third uplink information from the first uplink information and the second uplink information; and wherein a priority of the BFRQ information is the same as a priority of target uplink information, wherein the target uplink information comprises a C-RNTI MAC CE or data from UL-CCCH.

2. The method according to claim 1, wherein the third uplink information comprises at least one of the following:

all or part of the first uplink information; and all or part of the second uplink information.

3. The method according to claim 1, wherein the first BFRQ information is BFRQ information for a cell, BFRQ information for a bandwidth part (BWP), or BFRQ information for a transmission reception point (TRP) or, wherein the second uplink information is uplink information for a cell, uplink information for a bandwidth part (BWP), or uplink information for a transmission reception point (TRP).

4. The method according to claim 1, wherein the first priority relationship comprises any one of the following:

a priority of the BFRQ information is higher than a priority of fourth uplink information, wherein the fourth uplink information is uplink information except the BFRQ information; and a priority of the BFRQ information is between a first priority and a second priority that are adjacent, wherein the first priority and the second priority are priorities corresponding to uplink information in the fourth uplink information.

5. The method according to claim 1, wherein the first priority relationship comprises at least one of the following:

a priority of BFRQ information for a primary cell or a primary secondary cell is greater than that of BFRQ information for a secondary cell; and a priority relationship among different BFRQ information determined based on cell information, wherein the different BFRQ information is BFRQ information for different secondary cells.

6. The method according to claim 1, wherein the first priority relationship comprises a priority relationship among different BFRQ information determined based on bandwidth part (BWP) information or transmission reception point (TRP) information.

7. The method according to claim 1, wherein an uplink resource for the first uplink information at least partially overlaps an uplink resource for the second uplink information.

8. A terminal, comprising a memory, a processor, and a program stored in the memory and capable of running on the processor, wherein when the program is executed by the processor, the following steps are implemented:

determining, based on a first priority relationship, third uplink information from first uplink information and second uplink information, wherein the first uplink information is first beam failure recovery request (BFRQ) information; and transmitting the third uplink information by using a first uplink resource;

wherein the second uplink information comprises at least one of the following:

a C-RNTI MAC CE;

a MAC CE for transmitting a configured grant confirmation;

a MAC CE for transmitting a single entry power headroom report or a MAC CE for transmitting a multiple entry power headroom report;

a MAC CE for transmitting a recommended bit rate query; or a MAC CE for transmitting second BFRQ information, wherein the MAC CE that transmits the second BFRQ information is the same as or different from the MAC CE that transmits the first BFRQ information; wherein the BFRQ information is carried in a medium access control control element (MAC CE);

wherein the determining by the terminal, based on a first priority relationship, third uplink information from first uplink information and second uplink information comprises: in a case that the first uplink information and the second uplink information cannot be transmitted at the same time on the first uplink resource, determining, by the terminal, based on the first priority relationship, the third uplink information from the first uplink information and the second uplink information; and wherein a priority of the BFRQ information is the same as a priority of target uplink information, wherein the target uplink information comprises a C-RNTI MAC CE or data from UL-CCCH.

9. The terminal according to claim 8, wherein the third uplink information comprises at least one of the following:

all or part of the first uplink information; and all or part of the second uplink information.

10. The terminal according to claim 8, wherein the first priority relationship comprises any one of the following:

a priority of the BFRQ information is higher than a priority of fourth uplink information, wherein the fourth uplink information is uplink information except the BFRQ information;

a priority of the BFRQ information is the same as a priority of target uplink information, wherein the target uplink information comprises a C-RNTI MAC CE or data from UL-CCCH; and a priority of the BFRQ information is between a first priority and a second priority that are adjacent, wherein the first priority and the second priority are priorities corresponding to uplink information in the fourth uplink information.

11. The terminal according to claim 8, wherein the first priority relationship comprises at least one of the following:

a priority of BFRQ information for a primary cell or a primary secondary cell is greater than that of BFRQ information for a secondary cell; and a priority relationship among different BFRQ information determined based on cell information, wherein the different BFRQ information is BFRQ information for different secondary cells.

12. The terminal according to claim 8, wherein the first priority relationship comprises a priority relationship among different BFRQ information determined based on bandwidth part (BWP) information or transmission reception point (TRP) information.

13. The terminal according to claim 8, wherein an uplink resource for the first uplink information at least partially overlaps an uplink resource for the second uplink information.

14. A network device, comprising a memory, a processor, and a program stored in the memory and capable of running on the processor, wherein when the program is executed by the processor, the following steps are implemented:

receiving third uplink information transmitted by a terminal using a first uplink resource, wherein the third uplink information is uplink information determined by the terminal based on a first priority relationship from first uplink information and second uplink information in a case that the first uplink information and the second uplink information cannot be transmitted at the same time on the first uplink resource, and the first uplink information is first beam failure recovery request (BFRQ) information;

wherein the second uplink information comprises at least one of the following:

a C-RNTI MAC CE;

a MAC CE for transmitting a configured grant confirmation;

a MAC CE for transmitting a single entry power headroom report or a MAC CE for transmitting a multiple entry power headroom report;

a MAC CE for transmitting a recommended bit rate query; or a MAC CE for transmitting second BFRQ information, wherein the MAC CE that transmits the second BFRQ information is the same as or different from the MAC CE that transmits the first BFRQ information;

wherein the BFRQ information is carried in a medium access control control element (MAC CE); and wherein a priority of the BFRQ information is the same as a priority of target uplink information, wherein the target uplink information comprises a C-RNTI MAC CE or data from UL-CCCH.

15. The network device according to claim 14, wherein the third uplink information comprises at least one of the following:

all or part of the first uplink information; and all or part of the second uplink information.

16. The network device according to claim 14, wherein the first priority relationship comprises any one of the following:

a priority of the BFRQ information is higher than a priority of fourth uplink information, wherein the fourth uplink information is uplink information except the BFRQ information;

a priority of the BFRQ information is the same as a priority of target uplink information, wherein the target uplink information comprises a C-RNTI MAC CE or data from UL-CCCH; and a priority of the BFRQ information is between a first priority and a second priority that are adjacent, wherein the first priority and the second priority are priorities corresponding to uplink information in the fourth uplink information.

* * * * *